July 5, 1966 J. U. IANNCE 3,259,382

RING TYPE BALL GRIP MEANS

Filed April 24, 1964

INVENTOR.
JOHN U. IANNCE

BY Cullen, Sloman & Cantor

ATTORNEYS 3,259,382
RING TYPE BALL GRIP MEANS
John U. Iannce, Detroit, Mich., assignor to Etronic Corporation, Detroit, Mich.
Filed Apr. 24, 1964, Ser. No. 362,398
3 Claims. (Cl. 267—1)

Ring type ball grip means have long been known. In this application, I disclose a ring type ball grip means having a reaction or thrust spring in the form of a solidly annular spring disc of springy metal, for moving parts of the grip means for projecting or retracting the balls which do the gripping, or for thrust purposes.

While the ball grip means hereof happens to be disclosed in connection with arbors, it will be understood that it is of general application and may be employed in a variety of devices where ball grip means are employed, as for example, in tool holders, gages, arbors, chucks, collets, as well as other useful articles not here listed.

Two forms of arbors, male and female, have been disclosed fragmentarily in the appended drawings.

Figure 1:
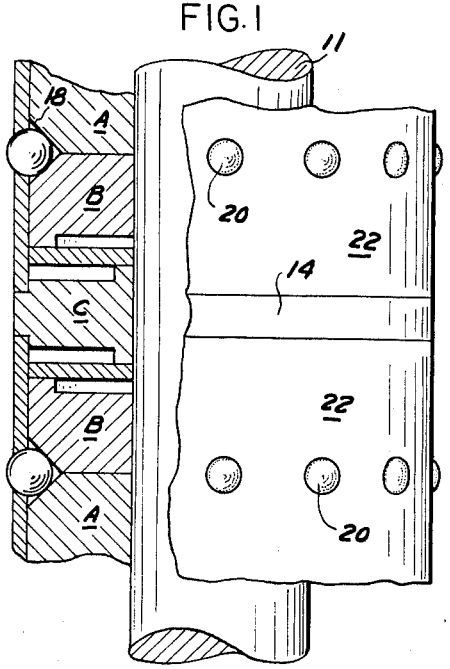
FIG. 1 is a cutaway view of a male type arbor.

Referring now to the drawing, we here describe the two forms of arbors of such drawings with particular emphasis directed to the functioning of the disc springs of such arbors.

Figure 2:
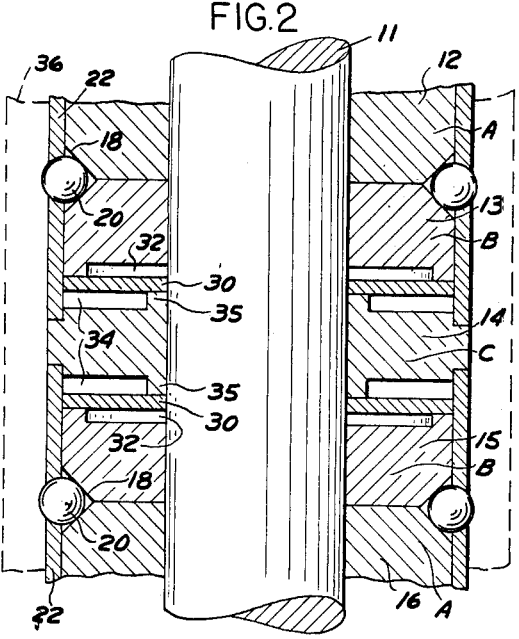
FIG. 2 is a sectional view of FIG. 1.

Male arbor; FIGS. 1 and 2

These figures show a male arbor comprising a shaft 11 surrounded by and supporting an assembly of various parts of an arbor including rings 12–13–14–15 and 16, with rings 12, 13, 15 and 16 being sometimes known as actuators, and ring 14 sometimes known as a spacer.

For analytical purposes, one set of rings 12, 13 and 14 will be identified as rings A, B and C; rings 16, 15 and 14 form another set, also referred to as A, B and C.

Rings A and B have cooperating wedging surfaces defining annular V grooves 18, there being a plurality or ring like series of balls 20 in each such groove, each set being held in place by a retainer ring 22.

Between each set of rings B and C are spaces 32 and 34; and also solidly annular or uncut flat thrust or reaction disc springs 30. Spring 30 has its inner edge engaged by a shoulder 35 of ring C alined with inner annular space 32; and has its outer edge overlying space 34.

Movement of the arbor into a female part 36 to be gripped causes the balls 20 to be retracted into their seating V groove 18 and this is accomplished as well as accompanied by longitudinal or axial separation movement of rings A and B relatively to deepen and widen the V groove 20 and permit retraction of the balls 20 away from the female part surrounding the arbor. Ring B moves towards ring C. This is the conventional operation of an arbor.

What is novel here is the fact that such operation causes the annular flat disc spring 30 to be deflected out of flat condition and into the spaces 32 and 34. This deflection in turn energizes the spring 30 so that such spring, when permitted, will return to flat condition to cause the various rings to move relatively to enshallow (make shallower) the V groove 18 seating the balls 20 and thus again projecting such balls radially.

Figure 3:
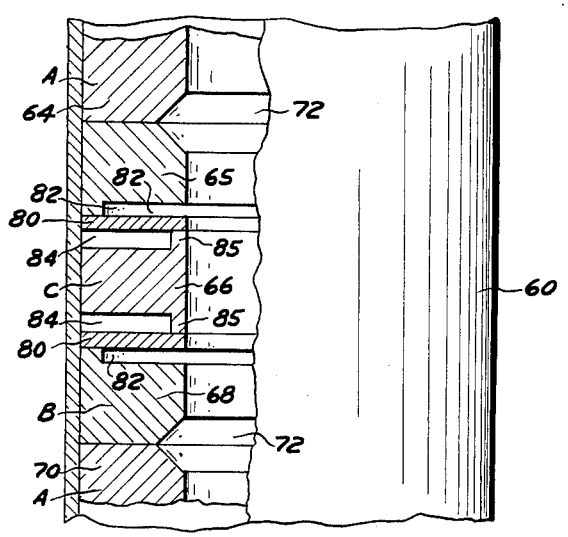
FIG. 3 is a cutaway view of a female arbor or chuck.

FIG. 3; Female arbor or chuck

FIG. 3 shows a female arbor or chuck comprising a shell 60 into which the arbor or chuck rings are assembled and held. Rings 64, 65, 66, 68, and 70, are further identified as rings A, B, C, B, and A respectively, and rings A–B have cooperating wedging surfaces defining V grooves 72 for seating balls not shown, there being ring retainers not shown for such balls. Between rings B and C are uncut or solidly annular flat disc springs 80.

Ring C has inner annular shoulders 85 opposite spaces 82, so that the inner edges of springs 80 are engaged by shoulders 85 of ring C, and the outer edges of springs 80 are engaged by rings B.

When the arbor parts are manipulated in the conventional manner for a female arbor, for gripping an inserted male part, the flat disc springs 80 operate in the manner similar to the operation of the flat disc springs 30 in the male arbor previously described, that is to say, when the parts are moved in a manner to widen and deepen the grooves 72, and permit retraction of the balls and away from the part to be gripped, the springs 80 are deflected out of their flat condition and into the adjacent spaces 82, 84. This energizes such springs so that such springs, when permitted, will return to flat condition and in so doing will cause movement of the arbor parts in a manner to enshallow (make shallow) the V grooves and project the balls radially inwardly.

Operation of arbors

The male arbor is manipulated for gripping a female workpiece or part in the following manner. The male arbor is pushed into the interior of the hollow workpiece whereupon the gripping balls wedge the arbor rings A and B longitudinally slightly apart moving rings B towards spacer ring C, and deflect the flat disc springs whose reactions now hold the arbor and the workpiece firmly together.

The release of the arbor and the workpiece is accomplished simply by pulling the workpiece off the arbor whereupon the balls are projected radially by the return of the springs to their flat condition and simultaneously by the movement of the arbor parts to enshallow the grooves (make shallow) in which the balls are seated.

In the case of a female arbor gripping a male workpiece, the arbor is pushed onto the male workpiece within the arbor whereupon the balls are projected radially back into their V seating grooves and this deflects the flat disc springs whose reaction now holds the arbor and workpiece firmly together. Release is accomplished simply by pulling the workpiece off the arbor whereupon the flat disc springs return to the flat condition and cause movement of the arbor parts to enshallow the grooves (make them shallow) and return the gripping balls to their normal condition.

Ball grip means

The novel feature of the ball grip means herein disclosed is the use of solidly annular uncut disc springs in spaces between rings B and C which are moved towards each other for ball gripping action, with the flat disc springs being deflected longitudinally into such spaces, and providing a reaction which causes the gripping function to take place. On release of the ball gripping means from the gripped part, the deflected springs return to their normal condition and enshallow the V grooves seating the gripping balls to project the gripping balls to their normal condition.

The spaces in which the disc springs are enabled to be deflected longitudinally, such spaces being longitudinally adjacent such springs, are provided to provide clearance for the springs in their deflected condition, deflected out of their normal condition.

The springs: Dimensions

Each of the deflectable or dishable annular normally flat non-compressible springs herein shown is of metal treated so as to be hardened, tempered, and stiff but springy, and non-brittle.

In one embodiment, and in one example, a male arbor was formed to the following dimensions, in inches, with tolerances not mentioned.

(30) Spring: O.D.—.875; I.D.—.440; thickness—.015; ground faces; stock 1.00 x .06; RC 48–52;
(11) Shaft: O.D.—.4375; groove face at 45°;
(A–B) Ring: O.D.—.878; I.D.—.4375; snug fit on shaft;
(C) Spacer Ring: O.D.—.988; I.D.—.4375; snug fit on shaft;
(22) Retainer rings: O.D.—.988; I.D.—.888; 12 holes at 15°; .113 diam.;
(20) Gripping balls; 12 per set, steel, .1250 diam.
(32) Clearance space on B/C surface of ring B—.04
(34) Clearance space on B/C surface of ring C—.008/.010

Now having described the ball grip means herein disclosed, reference should be had to the claims which follow.

I claim:
1. In a ring type ball grip means having an assembly of three axially longitudinally arranged rings hereafter referred to as rings A, B and C; with rings A and B having adjacent tapered wedging surfaces defining an annular V groove containing a ring of gripping balls, with such balls being normally projected radially from said groove in accompaniment to the relative longitudinal approach of rings A and B and the narrowing and enshallowing of said groove; and with such balls retracted into said groove in accompaniment to the relative longitudinal separation of rings A and B and the widening and deepening of said groove;

the improvement which comprises a longitudinally deflectable, solidly annular, normally undeflected thrust or reaction spring of non-compressible material, abutting and between rings B and C;

with one of such rings B and C having a longitudinally adjacent clearance space, the other of such rings B and C having means to cause longitudinal deflection of said spring into such space in response to loading of said spring upon relative longitudinal approach of rings B and C, in accompaniment to relative longitudinal separation of rings A and B, and retraction of said balls;

said spring, when so loaded and longitudinally deflected into said clearance space, having an inherent tendency to return to normal unloaded condition in accompaniment to relative longitudinal separation of rings B and C and to relative longitudinal approach of rings A and B and projection of said balls.

2. In a ring type ball grip means having an assembly of three axially longitudinally arranged rings, hereafter referred to as rings A, B and C; with rings A and B having adjacent tapered wedging surfaces defining an annular V groove containing a ring of gripping balls, with such balls being normally projected radially from said groove in accompaniment to the relative longitudinal approach of rings A and B and the narrowing and enshallowing of said groove and with such balls retracted into said groove in accompaniment to the relative longitudinal separation of rings A and B and the widening and deepening of said groove;

the improvement which comprises a longitudinally deflectable spring between rings B and C;

with one of such rings B and C having a longitudinally adjacent clearance space, the other of such rings B and C having means to cause longitudinal deflection of said spring into such space in response to loading of said spring upon relative longitudinal approach of rings B and C, in accompaniment to relative longitudinal separation of rings A and B, and retraction of said balls;

said spring when so loaded and longitudinally deflected into said clearance space having an inherent tendency to return to normal unloaded condition in accompaniment to relative longitudinal separation of rings B and C and to relative longitudinal approach of rings A and B and projection of said balls.

3. Means according to claim 2 wherein the spring is solidly annular, and normally undeflected, and of non-compressible material.

References Cited by the Examiner
UNITED STATES PATENTS 2,000,688   5/1935   Burr et al. _____ 267—1 X
2,191,901   2/1940   Wallgren.
2,775,137   12/1956  Chung.
3,100,117   8/1963   Sneider _____ 279—75 X ARTHUR L. LA POINT, *Primary Examiner.*
W. B. WILBER, *Assistant Examiner.*